UNITED STATES PATENT OFFICE.

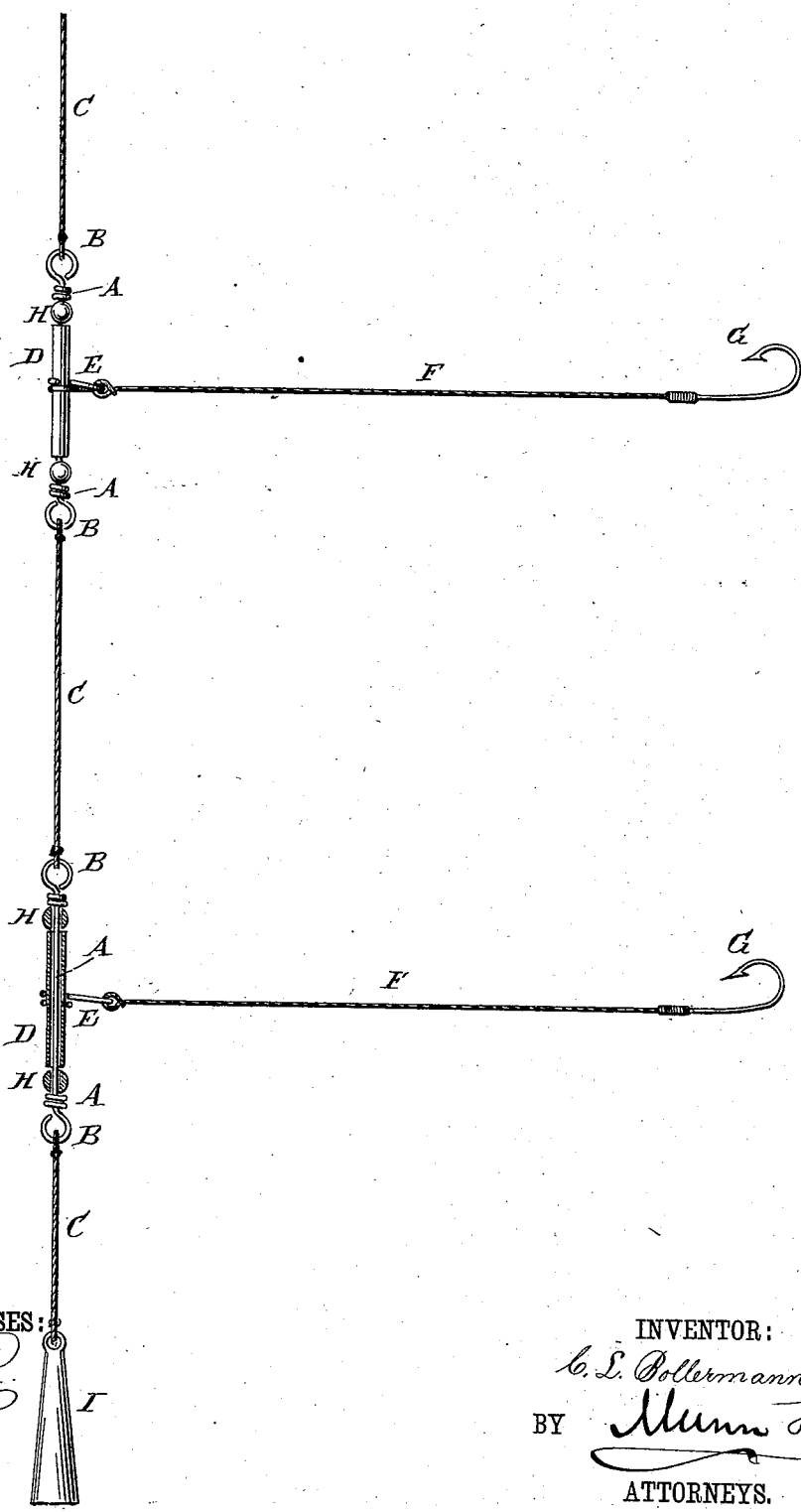

CARL LUDWIG BOLLERMANN, OF NEW YORK, N. Y.

ROTARY LEADER-LINK FOR FISHING-LINES.

SPECIFICATION forming part of Letters Patent No. 289,612, dated December 4, 1883.

Application filed July 19, 1883. (No model.)

*To all whom it may concern:*

Be it known that I, C. L. BOLLERMANN, of the city and State of New York, have invented an Improvement in Fishing-Lines, of which the following is a specification.

The invention relates to that species or class of fishing-lines generally termed "hand-lines," in which there is a weight at the end which goes into the water, and above the weight two or more knots, which are made to receive the snells carrying the hooks. The land end of the line is secured to the person of the fisherman, or to the bank or boat on which he may be. The fisherman throws the leaded end of the line out in the stream, where it sinks to the bottom, leaving the snells with their hooks at varying distances from the ground and from the lead. In throwing out the line the latter receives a greater or less number of turns, whereby the snells become wrapped about or tangled up with the line; and it is the object of my invention to produce a hand-line not open to this objection.

The drawing is a front or rear elevation, showing the water end of the line which embodies my invention.

C represents a fishing-line, which has been cut at two points, and between the cut ends inserted the rods A A. On each of these rods is a loose tube, D, having at right angles thereto a fastening, E, which is rigidly attached. This fastening is formed of a wire, which is coiled about the tube, and one of its ends bent to form a hook for convenient attachment and detachment of the snell F. At each end of the rod A is an eye or loop, to which the cut ends of the line are attached. I make a coil on the inside of each eye B, and place against this a ball or bead, H, with which the tube comes in frictional contact when the line twists or turns. By this means the snells F will always assume the position shown in the drawing when the lead has reached the bottom of the stream, lake, or ocean, thus avoiding the usual wrap or tangle with the line.

I am aware that it is not broadly new to apply a rotatable sleeve or cylinder to a rod having an eye to adapt it for attachment to a line. For example, Patent No. 271,424 illustrates a trolling or spoon bait, in which the body of the bait represents a fish or insect, and is applied eccentrically to a rod, around which it is free to rotate. Nor is it novel to reduce friction by means of beads of glass or other equally serviceable material; but What I believe to be new and patentable, and therefore claim, is—

The improved attachment for fishing-lines, consisting of the rod A, having a loop and coil at each end, the beads H, placed in contact with said coils, the tube D, made concentric with said rod, around which it is free to rotate, the fastening E, applied to the tube, and the snell F, secured to said fastening, all as shown and described, to operate as specified.

CARL LUDWIG BOLLERMANN.

Witnesses:
JAMES T. GRAHAM,
C. SEDGWICK.